(12) United States Patent
Browne et al.

(10) Patent No.: US 7,637,559 B2
(45) Date of Patent: *Dec. 29, 2009

(54) VOLUME-FILLING MECHANICAL ASSEMBLIES AND METHODS OF OPERATING THE SAME

(75) Inventors: Alan L. Browne, Grosse Pointe, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 375 days.

This patent is subject to a terminal disclaimer.

(21) Appl. No.: 11/384,042

(22) Filed: Mar. 17, 2006

(65) Prior Publication Data

US 2006/0186701 A1 Aug. 24, 2006

Related U.S. Application Data

(63) Continuation-in-part of application No. 11/093,271, filed on Mar. 29, 2005, now Pat. No. 7,401,846, and a continuation-in-part of application No. 11/092,127, filed on Mar. 29, 2005, and a continuation-in-part of application No. 11/093,272, filed on Mar. 29, 2005, now Pat. No. 7,374,231.

(60) Provisional application No. 60/559,249, filed on Apr. 2, 2004, provisional application No. 60/559,165, filed on Apr. 2, 2004, provisional application No. 60/559,115, filed on Apr. 2, 2004.

(51) Int. Cl.
 *B60R 21/34* (2006.01)

(52) U.S. Cl. ............................. 296/187.02; 296/187.03; 296/187.09; 296/187.11

(58) Field of Classification Search ............ 296/187.02, 296/187.03, 187.09, 187.11, 187.12, 193.05, 296/193.06, 203.01, 203.2, 204, 205, 209; 188/377

See application file for complete search history.

(56) References Cited

U.S. PATENT DOCUMENTS

| | | | |
|---|---|---|---|
| 3,339,673 A | 9/1967 | Schafer | 188/377 |
| 3,888,502 A | 6/1975 | Felzer et al. | 280/784 |
| 4,170,380 A | 10/1979 | Raitport | 296/68.1 |
| 5,454,589 A | 10/1995 | Bosio et al. | 280/729 |
| 5,700,034 A | 12/1997 | Lane, Jr. | 280/805 |
| 5,715,757 A | 2/1998 | Dannawi et al. | 105/392.5 |
| 6,158,771 A | 12/2000 | Nusser et al. | 280/752 |
| 6,302,439 B1 | 10/2001 | McCurdy | 280/735 |
| 6,327,813 B1 | 12/2001 | Ishiwatari | 43/125 |
| 6,378,933 B1 | 4/2002 | Schoen et al. | 296/187.02 |
| 6,383,610 B1 | 5/2002 | Barz et al. | 428/192 |
| 6,471,285 B1 | 10/2002 | Czaplicki et al. | 296/187.02 |
| 6,575,526 B2 | 6/2003 | Czaplicki et al. | 296/187.02 |
| 6,702,366 B1 | 3/2004 | Browne et al. | 296/187.02 |
| 6,755,453 B2 * | 6/2004 | Kellas | 293/128 |
| 6,874,831 B1 | 4/2005 | Pouget et al. | 293/115 |
| 6,877,795 B2 | 4/2005 | Browne et al. | 296/187.02 |
| 6,920,693 B2 | 7/2005 | Hankins et al. | 29/897.2 |

(Continued)

FOREIGN PATENT DOCUMENTS

DE 44 25 830 5/1995

(Continued)

*Primary Examiner*—Glenn Dayoan
*Assistant Examiner*—Gregory Blankenship

(57) ABSTRACT

A volume-filling mechanical structure comprising a honeycomb celled material expandable from a compact state to an expanded state and methods for operating the same.

20 Claims, 6 Drawing Sheets

U.S. PATENT DOCUMENTS

| | | | |
|---|---|---|---|
| 6,928,736 B2 | 8/2005 | Czaplicki et al. | 29/897.2 |
| 6,969,551 B2 | 11/2005 | Richardson et al. | 428/304.4 |
| 7,040,658 B2 * | 5/2006 | Kellas | 280/751 |
| 7,077,460 B2 | 7/2006 | Czaplicki et al. | 296/287.02 |
| 7,082,868 B2 * | 8/2006 | Reichman | 89/36.02 |
| 7,150,495 B2 | 12/2006 | Fayt et al. | 296/187.02 |
| 7,264,271 B2 * | 9/2007 | Barvosa-Carter et al. | 280/751 |
| 7,267,367 B2 * | 9/2007 | Barvosa-Carter et al. | 280/753 |
| 7,288,326 B2 * | 10/2007 | Elzey et al. | 428/593 |
| 7,350,851 B2 * | 4/2008 | Barvosa-Carter et al. | 296/187.02 |
| 7,374,231 B2 * | 5/2008 | Aase et al. | 296/187.02 |
| 7,401,846 B2 * | 7/2008 | Browne et al. | 296/187.02 |
| 2001/0048215 A1 | 12/2001 | Breed et al. | 280/728.1 |
| 2003/0155753 A1 | 8/2003 | Breed | 280/735 |
| 2004/0041418 A1 * | 3/2004 | Kellas | 293/128 |
| 2005/0218696 A1 | 10/2005 | Aase et al. | 296/187.02 |
| 2005/0234139 A1 | 10/2005 | Browne et al. | 521/50 |
| 2005/0234140 A1 | 10/2005 | Aase et al. | 521/50 |
| 2006/0186701 A1 | 8/2006 | Browne et al. | 296/187.02 |

FOREIGN PATENT DOCUMENTS

| | | |
|---|---|---|
| DE | 100 14 888 | 11/2001 |
| EP | 0 978 442 | 2/2000 |
| WO | WO 03/053749 A2 | 3/2003 |

* cited by examiner

VOLUME-FILLING MECHANICAL ASSEMBLIES AND METHODS OF OPERATING THE SAME

CROSS-REFERENCE TO RELATED APPLICATIONS

The present application is a continuation-in-part of, and claims priority to, U.S. patent application Ser. No. 11/093,271, filed on Mar. 29, 2005 now U.S. Pat. No. 7,401,846, which claims the benefit of U.S. Provisional Patent Application Ser. No. 60/559,249, filed on Apr. 2, 2004; U.S. patent application Ser. No. 11/092,127, filed on Mar. 29, 2005, which claims the benefit of U.S. Provisional Patent Application Ser. No. 60/559,165, filed on Apr. 2, 2004; and U.S. patent application Ser. No. 11/093,272, filed on Mar. 29, 2005 now U.S. Pat. No. 7,374,231, which claims the benefit of U.S. Provisional Patent Application Ser. No. 60/559,115, filed on Apr. 2, 2004; all of which are incorporated by reference in their entireties.

BACKGROUND

The present disclosure generally relates to volume filling mechanical structures utilized for controlled impact energy management. The volume filling mechanical structures are volumetrically reconfigurable such as to occupy a small volume when in a dormant state and rapidly expand to a larger volume in a deployed state upon activation by an activation mechanism.

Many strategies have been developed in the art of vehicle design for absorbing energy and attenuating impacts experienced by both vehicle occupants and pedestrians in motor vehicle impact events. As such, a vehicle, in addition to the inherent crush characteristics of its structure, may have various dedicated energy absorbing structures. Their function is to dissipate energy and limit forces and decelerations occupants/pedestrians experience in the event of an impact. In the vehicular arts, there are generally two types of such dedicated energy management structures: those that are passive, and those that are active.

An example of an energy absorbing structure that has been used in vehicles is an expanded honeycomb celled material, which is disposed in the expanded form within the vehicle environment. FIG. 1 illustrates a honeycomb celled material and its process flow for fabricating the honeycomb-celled material. A roll 10 of sheet material having a selected width W is cut to provide a number of substrate sheets 12, each sheet having a number of closely spaced adhesive strips 14. The sheets 12 are stacked and the adhesive is cured to thereby form a block 16 having a thickness T. The block 16 is then cut into appropriate lengths L to thereby provide so-called bricks 18. The bricks 18 are then expanded by physical separation of the upper and lower faces 20, 22, where adhesive strips serve as nodes to form the honeycomb cells. A fully expanded brick is composed of a honeycomb celled material 24 having clearly apparent hexagonally shaped cells 26. The ratio of the original thickness T to the expanded thickness T' is between about 1:10 to about 1:60. The honeycomb celled material is then used in fully expanded form within the vehicle environment to provide impact energy management and/or occupant protection (through force and deceleration limiting) substantially parallel or at an acute angle with respect to the cellular axis. As noted, because the honeycomb material is used in the fully expanded form, significant vehicular space is permanently used to accommodate the expanded honeycomb material.

The expanded honeycomb celled material provides impact energy management parallel or at an acute angle with respect to the cellular axis at the expense of vehicular space that is permanently occupied by this dedicated energy management structure.

Energy absorbing structures often have a static configuration in which their starting volume is their fixed, operative volume, i.e. they dissipate energy and modify the magnitude and timing characteristics of the deceleration pulse by being compressed (i.e., crushing or stroking of a piston in a cylinder) from a larger to a smaller volume. Since these passive crash energy management structures occupy a maximum volume in the uncrushed/unstroked, initial state, they inherently occupy vehicular space that must be dedicated for impact energy management—the contraction space being otherwise unusable. Expressed another way, passive impact energy management structures use valuable vehicular space equal to their initial volume, which is dedicated exclusively to impact energy management throughout the life of the vehicle even though an impact may never occur, or may occur but once during that time span.

One major category of active energy absorbing structures includes those that have a predetermined size that expands at the time of an impact so as to increase their contribution to impact energy management. One type of such a dedicated volume/size changing active energy absorbing structure is a stroking device, basically in the form of a piston and cylinder arrangement. Stroking devices can be designed so as to have low forces in extension and significantly higher forces in compression (such as an extendable/retractable bumper system) which is, for example, installed at either the fore or aft end of the vehicle and oriented in the anticipated direction of impact induced crush. The rods of such devices would be extended to span the previously empty spaces upon the detection of an imminent impact or an occurring impact (if located ahead of the crush front). This extension could be triggered alternatively by signals from a pre-impact warning system or from impact sensors or be a mechanical response to the impact itself. An example would be a forward extension of the rod due to its inertia under a high G impact pulse. Downsides of such an approach include high mass and limited expansion ratio (1:2 rather than the 1:10 to 1:60 possible with a compressed honeycomb celled material).

Another example of a volume/size changing active energy absorbing structure is an impact protection curtain. For example, a roll down shade functions principally to contain the occupant within the vehicle. Containment is provided because the roll down curtain, while being flexible in bending when out of plane, is quite stiff in-plane.

Accordingly, there remains a need in the art for activation mechanisms for selectively deploying expandable energy absorbing devices used for impact attenuation, for structural reinforcement, and the like.

BRIEF SUMMARY

Disclosed herein are volume filling mechanical structures suitable for use in energy management and methods for their use. In one embodiment, a volume filling mechanical assembly for a vehicle comprises an open celled material expandable from a non-expanded state to an expanded state, wherein at least a portion of the open celled material comprises a shape memory alloy, and an activation mechanism regulating expansion of the open celled material from the non-expanded state to the expanded state in response to an activation signal.

A method of operating a volume filling structure includes sensing an impact event; producing an activation signal; and expanding the volume filling structure from a non-expanded state to an expanded state upon the sensed impact event, wherein the volume filling structure comprises an open celled material, wherein at least a portion of the open celled material comprises a shape memory alloy and an activation mechanism regulating expansion of the volume filling structure from the non-expanded state to the expanded state in response to the activation signal.

A method of stiffening and/or reinforcing a vehicle member comprises disposing a volume filling structure comprising a shape memory alloy within a vehicle member, wherein the volume filling structure is in an unexpanded state; thermally activating the shape memory alloy before, during, and/or after expansion of the volume filling structure; and expanding the volume filling structure within the vehicle member, wherein expanding and/or heating the volume filling structure stiffens and/or reinforces the vehicle member. The above described and other features are exemplified by the following figures and detailed description.

BRIEF DESCRIPTION OF THE DRAWINGS

Referring now to the figures, which are meant to be exemplary embodiments, and wherein the like elements are numbered alike.

DETAILED DESCRIPTION

The present disclosure provides energy management structures and methods for their use. The energy management structures generally comprise an expandable volume-filling mechanical structure for both vehicle impact energy management and occupant/pedestrian protection applications. Advantageously, the expandable volume-filling mechanical structure, also referred to herein as the energy absorbing device, effectively absorbs the kinetic energy associated with the impact and attenuates the severity of the impact event. As will be further described herein, suitable applications utilizing the energy absorbing device within or about a vehicle environment include, but are not intended to be limited to, impact energy dissipation, load path creation, modification of a vehicle deceleration pulse, local stiffening or reinforcement of the vehicle structure, stiffening or reinforcing closed section members subject to lateral loading, pedestrian impact protection, occupant protection, vehicle compatibility during impact events, impact protection to vulnerable components (e.g., fuel tank, interior passenger compartment, and the like).

Figure 1:
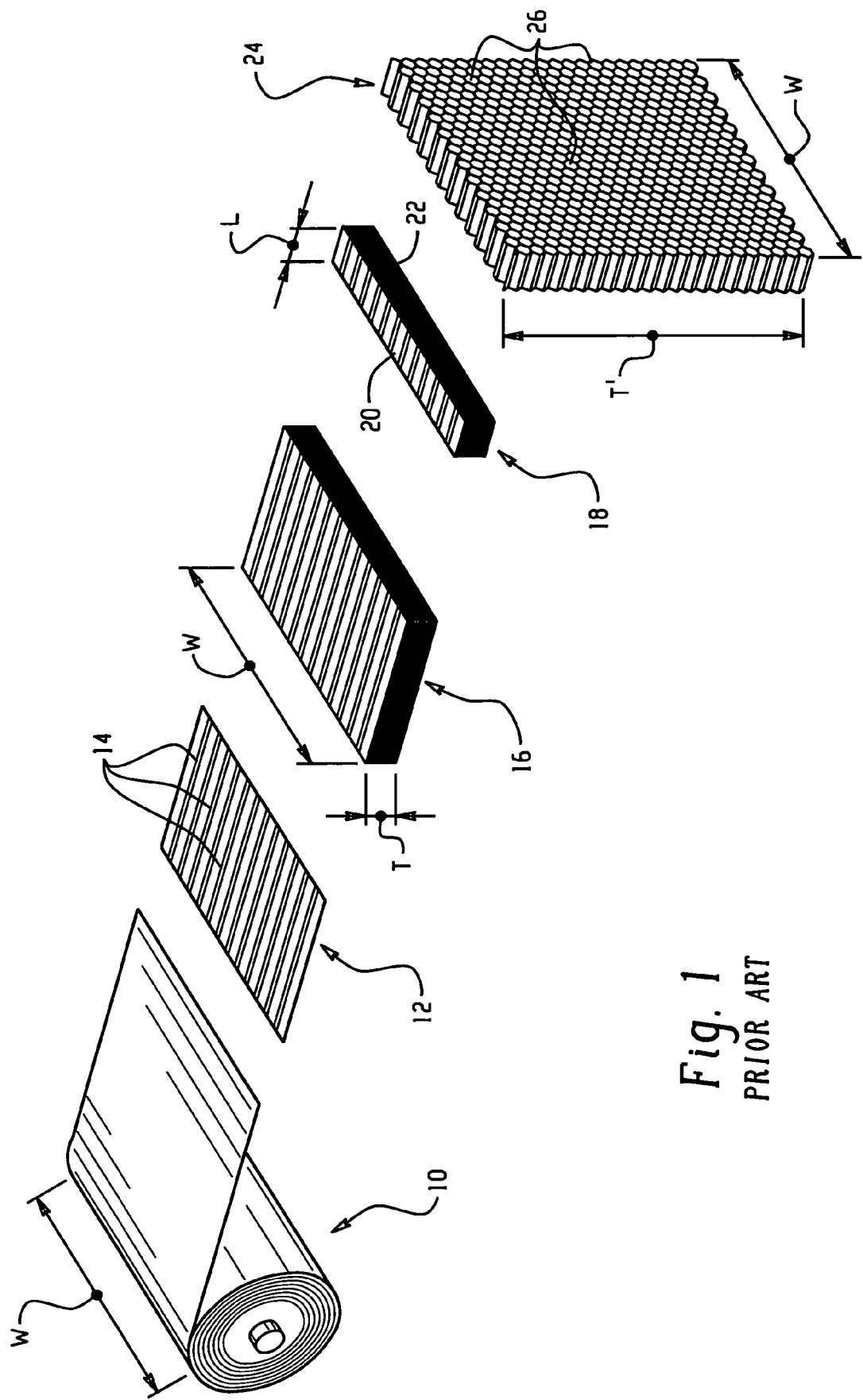
FIG. 1 is a perspective view of a manufacturing process to provide prior art honeycomb celled material.

In an exemplary embodiment, the volume-filling mechanical structure device of the present disclosure comprises a before-expansion open celled material brick, wherein expansion of the open celled material brick is in a plane perpendicular to the cellular axis of the cells thereof. Impact crush is intended to be parallel or at an acute angle with respect to the cellular axis and thus perpendicular to the direction of expansion of the cells. The open celled material is unexpanded in the sense that it is substantially fully compressed perpendicular to the longitudinal axis of its cells and parallel to the direction in which it is to be deployed. By way of example and for ease of understanding, reference will be made herein to a honeycomb shaped open celled material such as that shown in prior art FIG. 1.

The honeycomb brick occupies anywhere from approximately 1/10th to 1/60th of the volume that it assumes when in it is fully expanded (the expansion ratio) into an expanded honeycomb celled material (expanded honeycomb), depending on the original cell dimensions and wall thicknesses. Honeycomb cell geometries with smaller values of the expansion ratio generally deliver larger crush forces, and the choice of the honeycomb celled material is dependent upon the crush force (stiffness) desired in a particular application (i.e., softer or harder metals or composites). Expanded honeycomb celled materials provide adequate energy absorbing capabilities, but generally parallel or at an acute angle with respect to the cellular axis, as discussed hereinabove.

The materials for forming the honeycomb cellular structure are not intended to be limited. The choices for materials are generally dependent upon the desired crush force (stiffness) for a particular application (i.e., softer or harder metals or composites). In one embodiment, the honeycomb cellular structure is formed of a lightweight metallic material, e.g., aluminum. In another embodiment, the honeycomb cellular structure is formed of a shape memory alloy (SMA) material, which advantageously can be used to facilitate expansion of the honeycomb cellular structure from the unexpanded brick shape, compression of the expanded honeycomb cellular structure, provide a thermally activatable increase in the stiffness/energy absorption of the cellular structure, and/or repair of a damaged or crushed honeycomb cellular structure, as will be described in more detail below. Alternatively, a portion of the honeycomb cellular structure could be formed from SMA, while the remainder is formed from the lightweight metallic material or other such material. One such example is a honeycomb cellular structure having alternating sheets of aluminum and SMA. Other suitable materials that are non-metallic include, but are not limited to, polymers such as nylon, cellulose, and other like materials. The material composition and honeycomb geometries will be determined by the desired application.

Shape-memory alloy is the generic name given to alloys that exhibit the unusual property of a strain memory, which can be induced either mechanically or thermally. Shape memory alloys generally exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, deformation of the shape memory alloy at or below the austenite transition temperature (at or below As) followed by subsequent heating above the austenite transition temperature causes the deformed shape memory alloy to revert back to its permanent shape. Thus, a suitable activation signal for use with shape memory alloys is a thermal activation signal having a magnitude to cause transformations between the martensite and austenite phases. For those shape memory materials that are ferromagnetic, a magnetic and/or a thermal signal can be applied to effect the desired change in shape.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing a shape memory effect, superelastic effect, and high damping capacity. For example, in the martensite phase a lower elastic modulus than in the austenite phase is observed. Shape memory alloys in the martensite phase can undergo large deformations by realigning the crystal structure arrangement with the applied stress and can retain this deformation after the stress is removed. Shape memory alloys in the austenite phase (i.e., above Af) can also undergo large deformations by undergoing a stress-induced phase transformation to the martensite phase, but spontaneously revert back to the original form after the stress is removed.

Figure 2:
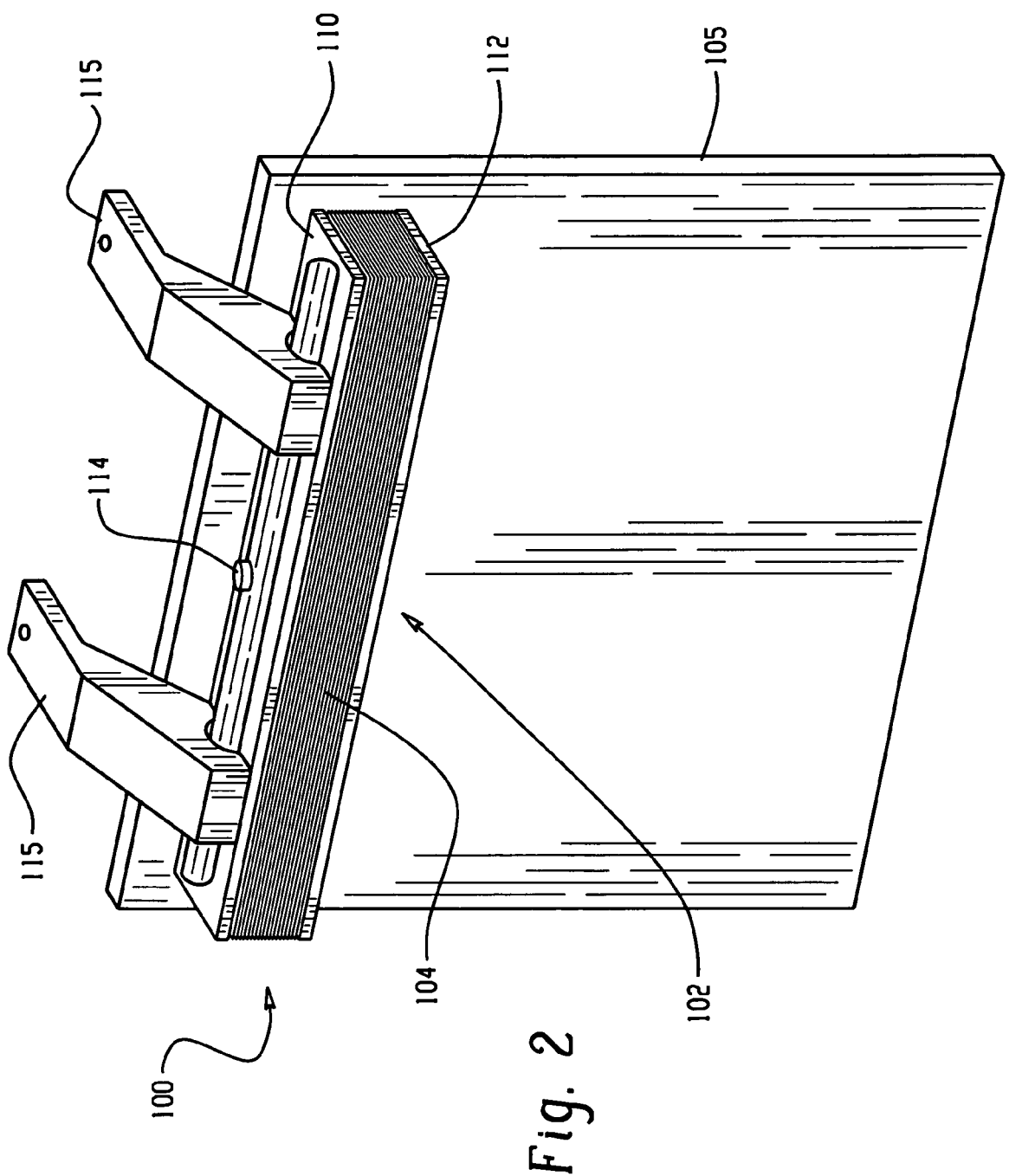
FIG. 2 is a perspective view of an energy absorbing device comprising compressed honeycomb cellular material in accordance with the present disclosure, shown prior to expansion (stored state)
Figure 3:
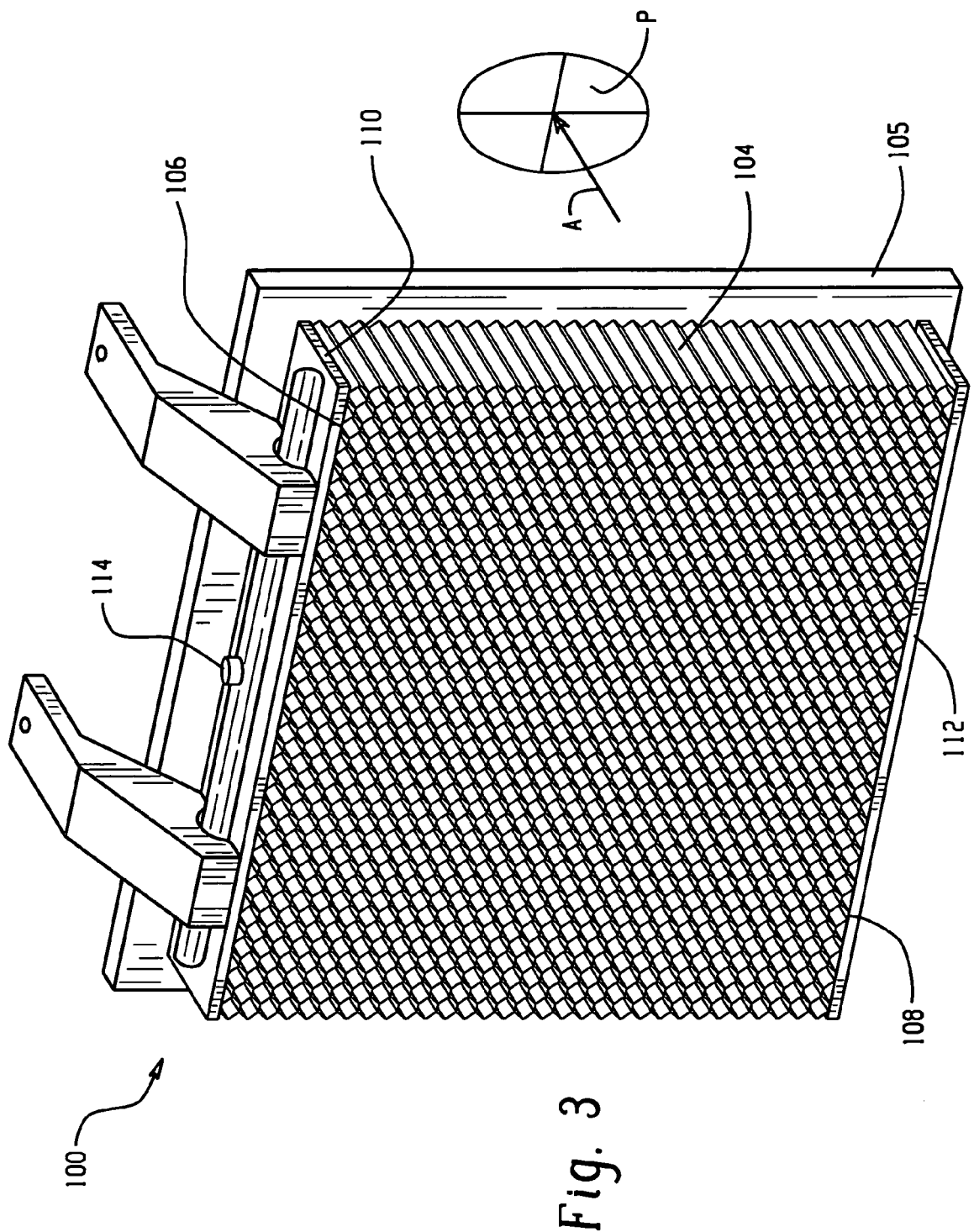
FIG. 3 is a perspective view of the energy absorbing device of FIG. 2 comprising expanded honeycomb cellular material in accordance with the present disclosure, shown in an expanded (deployed) state.

Turning now to FIGS. 2 and 3, perspective views of an exemplary volume-filling mechanical structure 100 of the present disclosure, shown prior to and upon expansion. Although FIG. 3 illustrates expansion of the assembly as having a generally square shape, other shapes are contemplated and are constrained only by the location of the device within the vehicle. For example, an arcuate profile may be effected for deployment within a wheel well. In the illustrated embodiment, a honeycomb celled material 104 is provided, such as for example, the material prepared according to a method of manufacture as discussed hereinabove. The honeycomb celled material 104 is initially stowed in a compact brick-like configuration as generally shown by reference number 102. Attached (for example by an adhesive) to the upper and lower faces 106, 108 of the honeycomb brick 102 are respective end caps 110, 112. The end caps 110, 112 are rigid and serve as guide members for defining the configuration of the honeycombed cell material 104 between a stored state as shown at FIG. 2 and a deployed state as shown at FIG. 3.

The end caps 110, 112 need not necessarily be planar. Indeed, they do not need to have the same shape or size. For example, the end caps 110, 112 may comprise a shape that compliments the area within the vehicle where the assembly 100 is located, such as a curved or a slanted shape orientation. For example, for expansion into a narrowing wedge shaped space, the end cap which moves as the honeycomb celled material expands may be shorter than the stationary end cap, so that the expanded honeycomb celled material has a complimentary wedge shape.

The volume-filling mechanical structure 100 preferably further comprises an optional support surface 105. Generally, the energy absorbing capacity of the assembly 100 is adequate to attenuate impact severity when the honeycomb material 104 expands along at least one support surface 105 to prevent the expanding honeycomb from flexing out of the way by stretching in plane through further expansion. As such, the assembly 100 may be employed in applications wherein a support surface is naturally available, and the honeycomb material 104 is situated to expand along this surface to provide suitable expansion of the honeycomb material 104. This includes impact between a pedestrian and vehicle, and between vehicle occupants and portions of the vehicle interior such as instrument panel, door interior, header, roof rails, and pillars.

Additionally, in applications in which there may be occupant/pedestrian impact directly against the expanded honeycomb cellular structure 104, there may be a deployable front surface anti-laceration shield or screen (not shown). The anti-laceration shield comprises any of a variety of suitable flexible materials known to those skilled in the art in view of this disclosure.

The activation mechanism, shown generally at reference numeral 114, is operably connected to the end caps 110, 112. The activation mechanism 114 controls the state of the honeycomb-celled material such that, when activated, an expansion from the compact state to the expanded state occurs. This expansion is necessarily rapid if in response to pre-crash and/or crash triggering. One or more installation brackets 115 may be connected to one of the end caps 110, 112 for securing one end of the volume-filling mechanical structure 100 to a selected position within the motor vehicle. The brackets 115 can be secured by any means (e.g., bolts, welding, and the like), and may take any shape, form, and/or configuration.

FIGS. 4 through 9 depict various embodiments of suitable activation mechanisms 114 for deploying the volume-filling mechanical structure 100.

Figure 4:
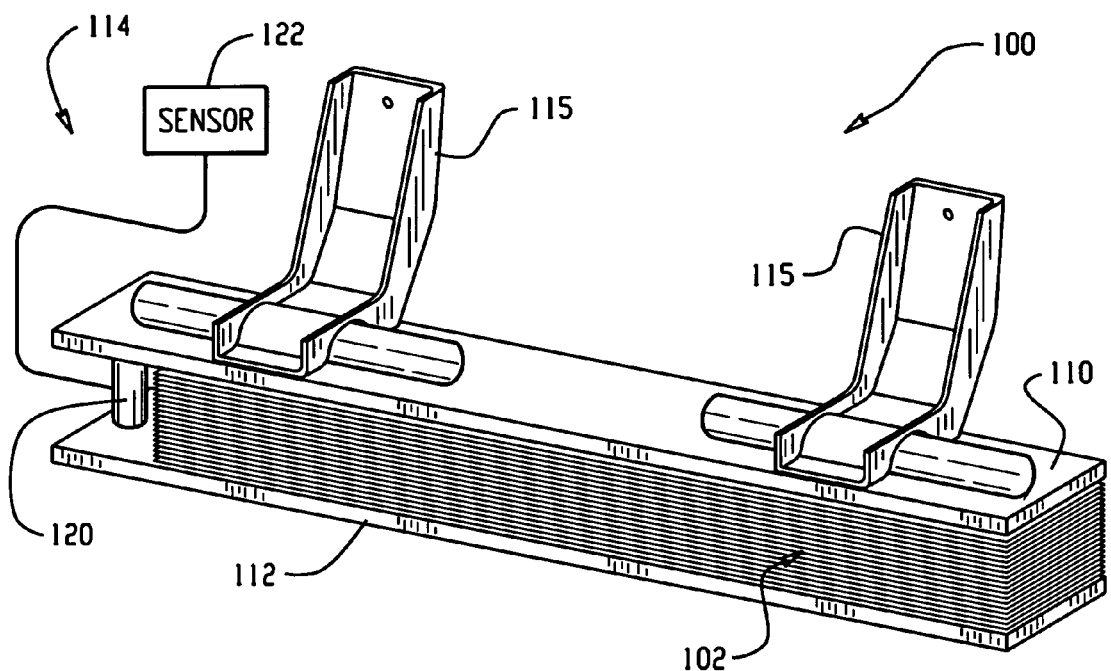
FIG. 4 is a perspective view of the energy absorbing device of FIG. 2 with an activation mechanism in accordance with a first embodiment.

In FIG. 4, the activation mechanism 114 utilizes a direct pyrotechnic deployment device 120. It is noted that pyrotechnic deployment devices 120 as disclosed herein are generally irreversible and involve the ignition of an explosive charge. In this embodiment, the pyrotechnic deployment device 120 is cylindrically shaped as shown and is disposed intermediate end caps 110, 112. However, the location of the pyrotechnic device is not intended to be limited to the location as shown and will generally depend on the desired deflection angle of the honeycomb celled material 104. One or more of these pyrotechnic deployment devices 120 can be employed. In this manner, activation of the pyrotechnic device 120 (i.e., detonation of the explosive charge), forcibly separates endplate 112 from the opposing endplate 110, thereby causing expansion of the honeycomb material 104. Moreover, since one of the end caps is fixedly attached to a stationary surface via brackets 115 or the like, deployment and subsequent expansion of the honeycomb-celled material can be controlled.

In a preferred embodiment, the pyrotechnic device 120 is in triggering communication with a sensor 122 (e.g., an impact sensor, a pre-impact sensor, or the like), or alternatively, an output signal from a control module (not shown) operating with embedded deployment logic that utilizes the signal from the sensor 122. Pre-crash sensors are suitable if programmed to eliminate false detects, although means are possible for resetting the device 120 in the case of an unwanted deployment, which would include, at a minimum, replacement of the explosive charge plus recompression of the now deployed and expanded honeycomb celled material 104.

If the honeycomb celled material 104 comprises an SMA material, recompression of the deployed and expanded honeycomb celled material 104 can simply be achieved by temperature activation of the SMA material if the memorized shape (i.e., shape to which the SMA material returns when heated above Af to its Austenite phase) is the compact, unexpanded honeycomb brick. A preferred source of heat to the SMA of the honeycomb celled material 104 is through the provision of electrical energy to the SMA to create heat through the resistance of the SMA itself. Another preferred source of heat is a different pyrotechnic device, which upon discharge can produce enough thermal energy to activate the SMA. Alternatively, if the SMA is in its high temperature (i.e., above Af), high modulus, austenitic phase at room temperature, the superelastic properties of the SMA will cause the expanded honeycomb celled material 104 to revert back to its compressed form after the expansion force generated by the pyrotechnic device has been discontinued.

If an unwanted deployment did not occur, and the honeycomb celled material 104 undergoes a crush force from an impact, an advantageous feature of using SMA in fabricating the honeycomb celled material 104 is the ability to repair the crushed honeycomb celled material 104 without having to replace it. As long as the deformation in the SMA does not result in a cracked or disassembled honeycomb celled material 104, then thermal activation of the SMA will return the honeycomb celled material 104 to its memorized configuration. In this case the memorized configuration is preferably the compressed brick configuration, but can also be the uncrushed expanded configuration, depending on the desired application. Alternatively, the superelastic properties of the SMA can be taken advantage of the SMA to its high temperature, high modulus shape after the crush force to which it has been exposed is no longer present.

Instead of, or in addition to, a direct pyrotechnic deployment device, an indirect pyrotechnic deployment means can be employed to provide momentum transfer energy sufficient to deploy the volume-filling mechanical structure 100. The sensor 122 provides a signal to the pyrotechnic device 120 to explode a pyrotechnic charge that propels a member (not shown) against a portion of the endcap 112, thereby causing expansion of the honeycomb celled material 104.

Figure 5:
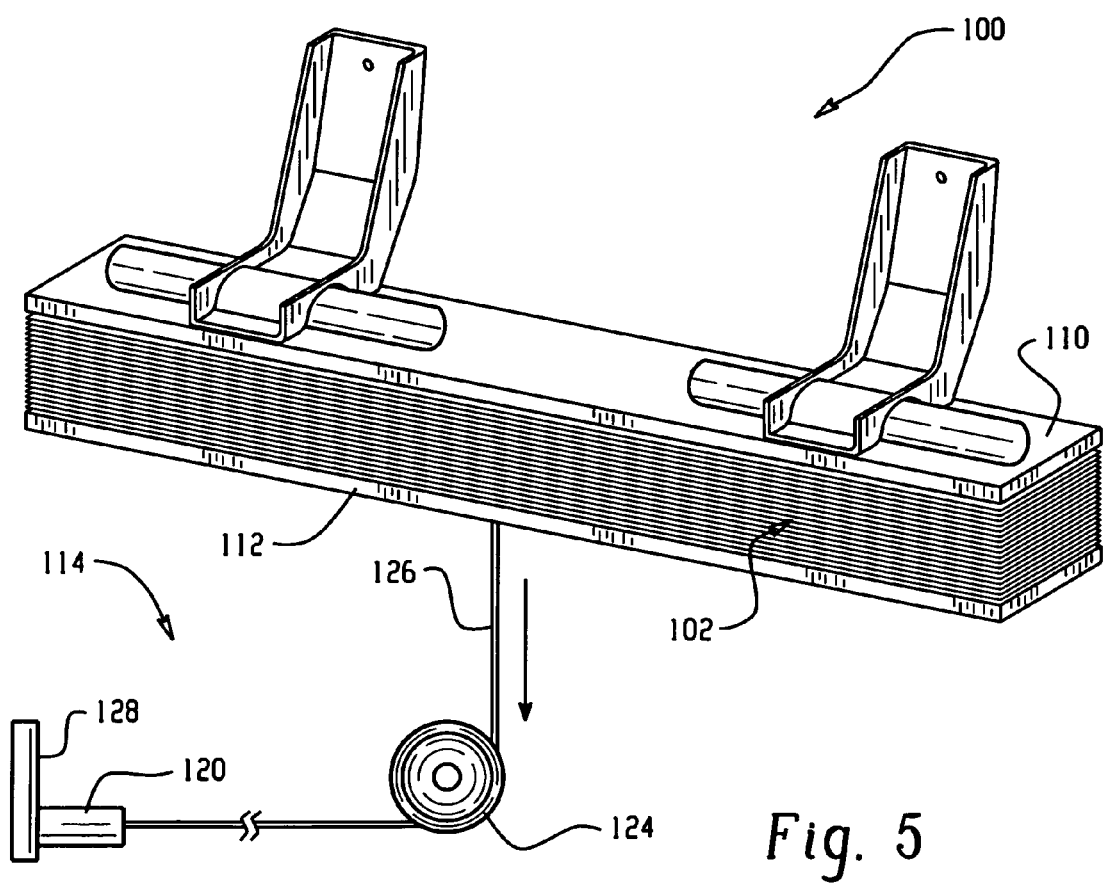
FIG. 5 is a perspective view of the energy absorbing device of FIG. 2 with an activation mechanism in accordance with a second embodiment.

FIG. 5 illustrates an indirect pyrotechnic deployment means that employs an interconnecting flexible tether 126 to facilitate expansion. The interconnecting tether 126 is bound at one end to rigid end cap 112 and is bound at the other tether end to a mass 128, which is attached to pyrotechnic device 120. The pyrotechnic device 120 is in operative communication with the mass 128 such that, upon actuation, the mass 128 exerts a force on the tether 126 and causes endcap 112 to rapidly pull away from the other endcap 110, thereby resulting in expansion of the honeycomb celled material 104. Activation of the pyrotechnic device 120 is preferably with a signal from the sensor 122 as previously described.

Optionally, one or more pulleys 124 are disposed on a surface spaced apart from and opposing the endcap 112, wherein the volume-filling mechanical structure 100 is in its compacted form and the tether 126 is in operative communication with the pulley 124. The mass 128 is attached to one end of the tether as previously described and is in operative communication with the pyrotechnic device 120 such that activation of the device 120 propels the mass 128 causing movement of the tether attached to endcap 112, thereby expanding the honeycomb cell material 104. The mass and path associated with its momentum are preferably offset from the path of the expandable honeycomb celled material 104. This embodiment provides increased versatility in the location within the vehicle of the volume-filling assembly 100. For example, the volume-filling assembly can be located within one portion of the vehicle whereas the mass 128 and pyrotechnic device 120 can be located at a different location within the vehicle.

Similarly, if the honeycomb celled material comprises an SMA, the deployed and expanded (or crushed) honeycomb celled material 104 can be returned to its memorized configuration (compressed, brick form or uncrushed, expanded form) by thermally activating the SMA or by taking advantage of its superelastic properties as described above.

In embodiments where the honeycomb celled material 104 comprises an SMA material, and the memorized shape of the SMA honeycomb celled material 104 is the expanded form, thermal energy from the pyrotechnic device 120 can be used to activate the SMA. This, alone, can be sufficient to effect deployment of the volume-filling mechanical structure 100. Alternatively, activation of the SMA can be used in combination with any of the foregoing pyrotechnic means of deployment to assist in the deployment of the volume-filling mechanical structure 100. However, if the honeycomb celled material 104 has already been expanded, heating the SMA will not cause it to change shape, but instead will cause an increase in the modulus of the SMA. An increase of stiffness by a factor of about 2.5 can be achieved by heating the SMA after it has already been expanded. In this manner, the strength of the honeycomb celled material 104 can be selectively adjusted or tuned if desired.

Although reference has been made to a pyrotechnic device, electrohydraulic and/or electromechanical devices (such as a motor driven screw drive) could also be used to directly or indirectly cause the expansion of the honeycomb material as would be recognized by one skilled in the art in view of this disclosure.

Figure 6:
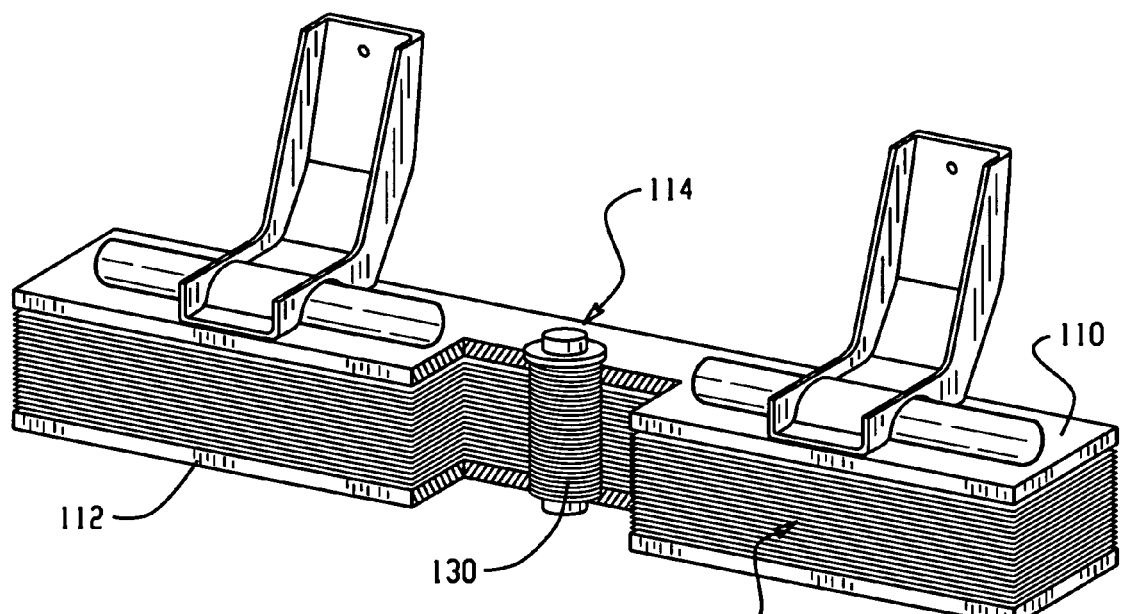
FIG. 6 is a perspective view of the energy absorbing device of FIG. 2 with an activation mechanism in accordance with a third embodiment.
Figure 7:
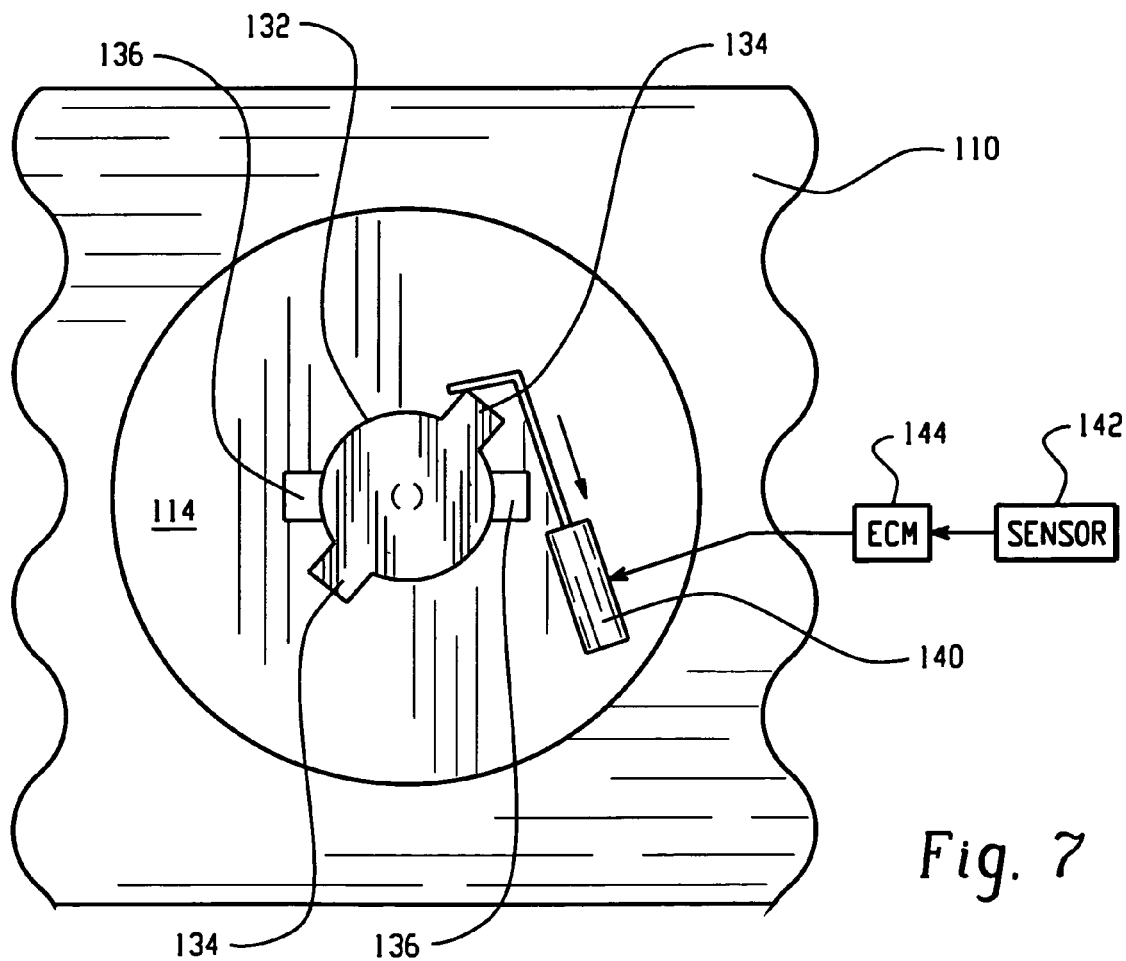
FIGS. 7 is top plan view of an activation mechanism in accordance with a fourth embodiment.

In another embodiment, the activation mechanism 114, as shown in FIGS. 6 and 7, is employed to trigger or actuate the volume-filling mechanical assembly 100. For example, a highly compressed spring 130 can be abuttingly situated between end caps 110, 112. The spring 130 is held highly compressed when the honeycomb celled material 104 is in the brick or stowed (compact) configuration. As shown more clearly in FIG. 7, in one embodiment, the activation mechanism 114 includes a disk 132 which is rotatably mounted to the end cap 110, wherein the disk 132 has a pair of opposed fingers 134 which are receivable by a pair of opposed slots 136 formed in the end cap 110. A trigger includes an active material based actuator 140, which effects selective rotation of the disc 130. The active material based actuator 140 is triggered by a signal from an impact sensor 142, which signal is interpreted by an electronic control module 144, which in response sends an activation signal to the active material based actuator 140. The activation signal to the active material based actuator 140 causes rotation of the disk 132 so as to cause the fingers 134 to fall into the slots 136 and thereupon the spring 130 to rapidly decompress. Other expansion agencies besides a compressed spring may include a pyrotechnic device or a pressurized air cylinder, for example. Alternatively, the activation mechanism 114 may be passive and mechanically triggered by an impact due to impact-induced movement of vehicle components.

As used herein, the term "active material" in reference to the active material based actuator 140 refers to several different classes of materials all of which exhibit a change in at least one attribute such as dimension, shape, and/or flexural modulus when subjected to at least one of many different types of applied activation signals, examples of such signals being thermal, electrical, magnetic, mechanical, pneumatic, and the like. One class of active materials is shape memory materials. These materials exhibit a shape memory effect. Specifically, after being deformed pseudoplastically, they can be restored to their original shape in response to the activation signal. Suitable shape memory materials include, without limitation, shape memory alloys (SMA) such as those used in the formation of the open celled material, ferromagnetic SMAs, and shape memory polymers (SMP). A second class of active materials can be considered as those that exhibit a change in at least one attribute when subjected to an applied activation signal but revert back to their original state upon removal of the applied activation signal. Active materials in this category include, but are not limited to, piezoelectric materials, electroactive polymers (EAP), magnetorheological fluids and elastomers (MR), electrorheological fluids (ER), electrostrictive polymers, ionic polymer gels, composites of one or more of the foregoing materials with non-active materials, combinations comprising at least one of the foregoing materials, and the like.

Of these active materials, preferred active material based actuators 140 are ferromagnetic SMA's, EAP's, MR elastomers, and piezoelectrics because of their quick response/short actuation times. Less preferable because they are thermally activated and thus have greater actuation times are shape memory alloys. SMA actuators or the like may be in the form of a spring, wire, finger, hook, or similar form that has a mechanical response upon the application of or removal of heat. SMA actuators are generally operable in a single direction, although two-way shape memory alloys are available. Similar to the SMA based honeycomb celled material, the preferred source of heat to the shape memory alloy actuators is through the provision of electrical energy to the wire to create heat through the resistance of the SMA actuator itself.

Upon decompression of the spring 130, the end cap 112, in operative communication therewith, causes expansion of the honeycomb celled material 104. In this particular embodiment, the compressed spring, or the like, is usually not returned to its dormant state after it has been deployed absent significant mechanical intervention, e.g., having it reset by a mechanic. However, if it is desirable for the volume-filling mechanical structure 100 of FIGS. 6 and 7 to be reset, replacement of the compressed spring, or the like, plus recompression of the now deployed and expanded honeycomb celled material are necessary. As described previously, if the honeycomb celled material 104 comprises an SMA material and the memorized shape of the SMA material is the compressed honeycomb celled brick, recompression of the deployed and expanded honeycomb celled material 104 can be achieved by temperature activation of the SMA material. If the spring, or the like, comprises an active material, it may not have to be replaced. Instead, for example, the active material spring, or the like, can be recompressed by subjecting it to an appropriate activation signal as described above.

Figure 8:
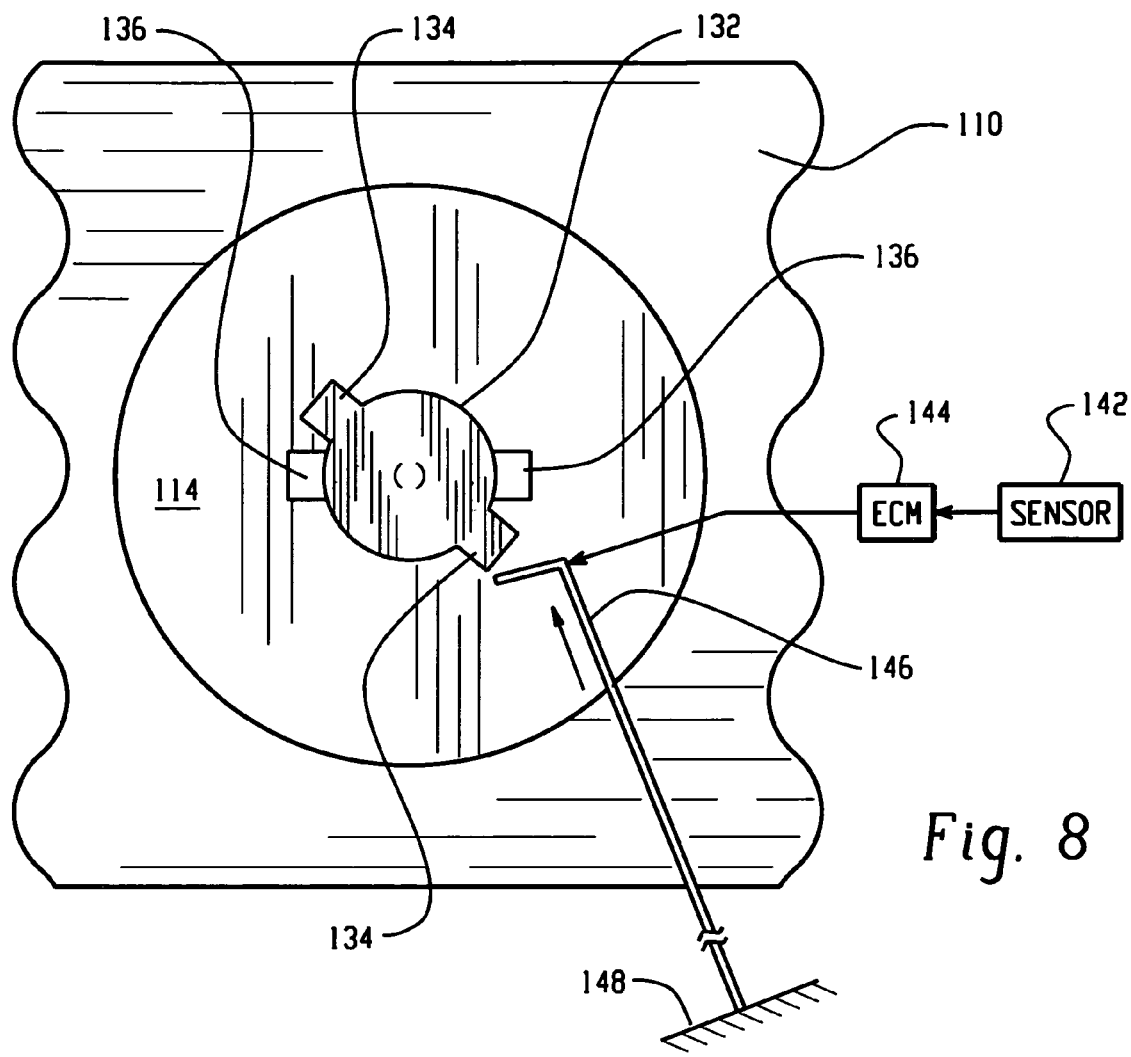
FIGS. 8 is top plan view of an activation mechanism in accordance with a fifth embodiment.

In FIG. 8, the compressed mechanical spring 130 is used in conjunction with a passive mechanical means. In one embodiment, an interconnecting flexible link 146 is attached at one end to disc 132, which restrains compressed mechanical spring 130 in the highly compressed state as previously described and is attached at the other end to surface 148. Upon an impact force being exerted against the surface 148, a tension is created in the interconnecting link 146, which effects rotation of restraining disc 130 to permit expansion of the compressed spring 130 and the honeycomb material 104. The latch for restraining spring 130 is not intended to be limited to any configuration. One of ordinary skill in the art will recognize that other latches can be activated by link 146 in view of this disclosure. For example, a simple L shaped latch can have one end of an upright portion pivotably attached to endcap 112 and a traverse member restraining the honeycomb material 104 and the compressed spring 130 by contact with end cap 110. Pivoting the upright portion removes contact of the traverse member and permits decompression of the spring. Pivoting can be effected by means of the link attached thereto. Advantageously, through gearing, a small displacement can be engineered to produce a large movement of the link with subsequent deployment of the honeycomb celled material 104.

In another embodiment, the compressed mechanical spring 130 can be actuated by means of a restraining clip or key. The clip or key would be removed by any one of the various means described above to allow concomitant expansion of the spring 130 and the honeycomb celled material 104. For example, the restraining clip or key may be removed by movement of the link, by an active material based actuator, by a solenoid, by a pyrotechnic device, by a pneumatic device, and the like.

The compressed mechanical spring 130, or the like, can be eliminated from the volume-filling mechanical assemblies 100 shown in FIGS. 6-8 by using a honeycomb celled material 104 comprising an SMA with a memorized shape of an expanded, uncompressed honeycomb celled material 104. If this high temperature, high modulus, austenitic phase at room temperature is then compressed between end caps 110, 112, triggering or actuating any of the activation mechanisms 114 as described above will cause the expansion of the honeycomb celled material 104, owing to the superelastic properties of the SMA.

In this particular embodiment, the SMA honeycomb celled material 104 cannot be returned to its compressed form absent significant mechanical intervention (e.g., having it clamped between end caps 110, 112 by a mechanic). If the honeycomb celled material 104 undergoes a crush force from an impact, the crushed honeycomb celled material 104 can be repaired without having to replace it. As long as the deformation in the SMA does not result in a cracked or disassembled honeycomb celled material 104, then thermal activation of the SMA will return the honeycomb celled material 104 to the uncrushed expanded configuration. Alternatively, the superelastic properties of the SMA can be taken advantage of to return the SMA to its high temperature, high modulus shape after the crush force to which it has been exposed is no longer present.

Figure 9:
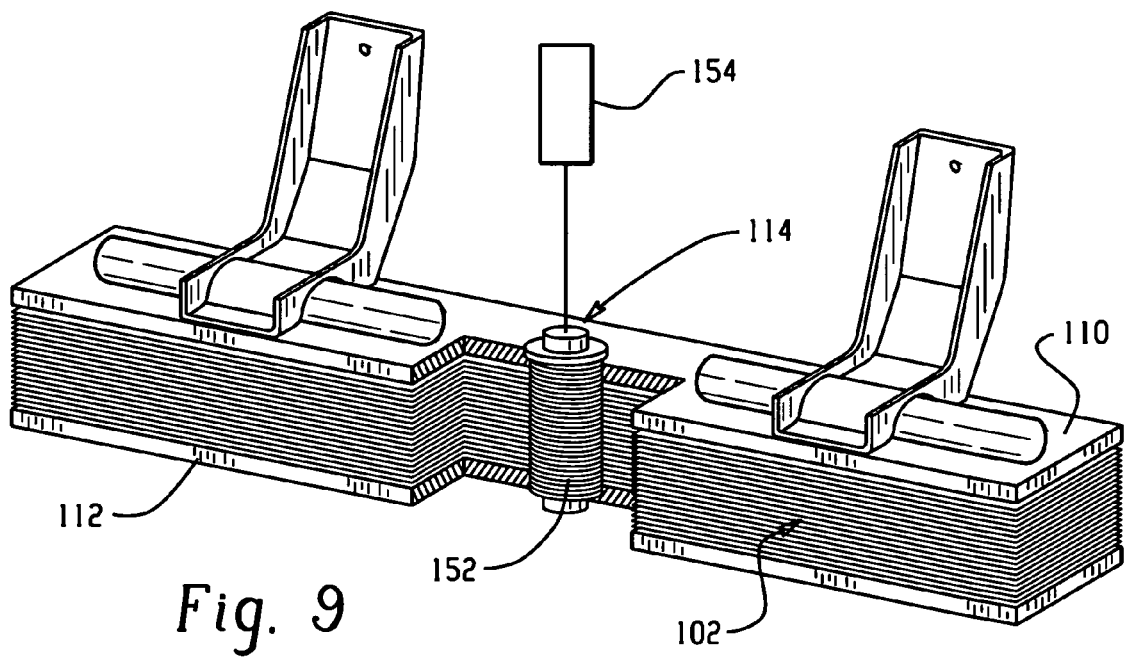
FIG. 9 is a perspective view of the energy absorbing device of FIG. 2 with an activation mechanism in accordance with a sixth embodiment.

FIG. 9 illustrates an embodiment of a direct activation mechanism 114 comprising a pneumatic device. The pneumatic device generally comprises an expandable conduit 152 extending from endplate 110 to endplate 112. One end of conduit 152 is in fluid communication with a fluid source 154; the other end is closed. An example of a suitable fluid source is a pressurized air source. The sensor 122 or 142, as previously described in reference to FIGS. 4 and 7, respectively, can be used to trigger release of the fluid (e.g., compressed air), from the fluid source 154.

Alternatively, pneumatic activation can occur by indirect means utilizing activation mechanisms similar to those previously described. For example, a tether, link, or mass can be pneumatically driven by compressed air, for example, to effect expansion of the honeycomb celled material 104. Likewise, an active material based actuator can be utilized to actuate the pneumatic device and cause subsequent expansion of the honeycomb celled material 104.

Upon pressurization of conduit 152, the endplates 110, 112 separate, thereby causing expansion of the honeycomb celled material 104. In this particular embodiment, the volume-filling mechanical structure 100 can be reset once pneumatic activation (i.e., pressurization) of conduit 152 is discontinued. Because there is little or no resistance from the unpressurized, expanded conduit 152, recompression of the deployed and expanded honeycomb celled material 104 is more easily accomplished.

The resetting process can be further simplified if the honeycomb celled material 104 comprises an SMA material whose memorized shape is the compact unexpanded honeycomb brick, because temperature activation of the SMA material minimizes or eliminates the need for any mechanical intervention during the resetting step. Alternatively, if the SMA is in its high temperature, high modulus, austenitic phase at room temperature, the superelastic properties of the SMA will cause the expanded honeycomb celled material 104 to revert back to its compressed form after the expansion force generated by the pneumatic device has been discontinued.

Similarly, if the expanded honeycomb celled material 104 undergoes a crush force from an impact, the crushed honeycomb celled material 104 can be repaired without having to replace it. As long as the deformation in the SMA does not result in a cracked or disassembled honeycomb celled material 104, then thermal activation of the SMA will return the honeycomb celled material 104 to its memorized configuration. In this case the memorized configuration is preferably the compressed brick configuration, but can also be the uncrushed expanded configuration, depending on the desired application. Alternatively, the superelastic properties of the SMA can be taken advantage of to return the SMA to its high temperature, high modulus shape after the crush force to which it has been exposed is no longer present.

In another embodiment, instead of a direct activation mechanism 114 comprising a pneumatic device, the direct activation mechanism 114 comprises a vacuum device. In this embodiment, the honeycomb celled material 104 comprises an SMA material with a memorized shape such that the honeycomb celled material 104 is in the expanded, uncompressed form. The honeycomb celled material 104 is compressed into the brick form by pulling a vacuum in the expandable conduit 152, which extends from endplate 110 to endplate 112. One end of conduit 152 is in fluid communication with the vacuum source (which can also be generally represented as 154); the other end is closed. Analogously, the sensor 122 or 142, can be used to trigger release of the vacuum.

Upon release of the vacuum within conduit 152, the endplates 110, 112 are free to separate and the superelastic properties of the SMA cause the honeycomb celled material 104 to revert to its expanded form. In this particular embodiment, the volume-filling mechanical structure 100 can be reset to its stowed, compressed form once a vacuum of sufficient strength is created within conduit 152. In addition, repair of a crushed honeycomb celled material 104 can be effected as described above.

A method of stiffening and/or reinforcing a vehicle member generally includes disposing a volume filling structure within a vehicle member, wherein the volume filling structure is in the unexpanded state; and expanding the volume filling structure within the vehicle member, wherein expanding the volume filling structure stiffens and/or reinforces the vehicle member. For example, the vehicle member can comprise a hollow rail structure, B-pillar, or the like. The volume filling structure can be disposed within the hollow structure, when desired, and then mechanically expanded to increase the stiffness or reinforce the strength of the vehicle member. For example, after welding operations and rust proofing, the volume filling structure can then be expanded.

Expansion of the volume filling structure to stiffen and/or reinforce the vehicle member can be achieved using any of the methods previously described. In an exemplary embodiment, a volume filling structure comprising an SMA open celled material can be expanded by thermally activating the SMA. In using a shape memory alloy instead of another material that requires a larger or more voluminous actuation device (e.g., pyrotechnic devices, electrohydraulic devices, electromechanical devices, and the like), an increased amount of space within the vehicle member can be occupied by the open celled material instead of the actuation device. Accordingly, increased stiffening and/or reinforcement of the vehicle member can be achieved.

It should be noted that the various forces discussed above, which are needed to directly or indirectly expand or assist in expanding the honeycomb celled material 104 to its deployed state, are generally about less than 1 kilo Newton (kN). The honeycomb celled material 104 may expand at a broad range of rates of expansion for example from about 0.01 to about 15 meters per second (m/s). Very simple means of bonding rigid end caps 110 and 112 to honeycomb celled material 104 in its dormant state may be used such as, for example, a two part epoxy adhesive.

As described with respect to several embodiments above, a reversible stored energy means of deployment may be returned to its dormant state after it has been deployed. Resetting of the means of deployment would involve resetting of the deployed honeycomb celled material 104 and a recharging or resetting of the stored energy device (e.g., recharging compressed air source, re-activating of the active material, regenerating a vacuum, and the like), which could be done manually or automatically.

Whether an irreversible or a reversible embodiment is chosen is dependent upon the application and the means of sensing and control used to trigger deployment. For example, devices based on pre-impact sensors might well be designed to be reversible but the devices should be non-intrusive and not affect vehicle functionality. There is less motivation for designing devices to be reversible whose deployment is based on impact sensing or indirectly by displacements caused by vehicle crush. However, as evident from the description above, in an advantageous feature of using SMA based open celled materials, the ability to repair a crushed open celled material can now be realized.

The devices disclosed herein for providing the means for deploying the volume-filling structure herein may be actuated by the sensing of an impending impact by pre-impact sensors. Stored energy means based on compressed air or a vacuum are highly desirable because they are easily engineered to release the stored energy when not needed. For example, in one embodiment, the compressed air or vacuum may be released when a vehicle is stopped and/or the ignition is turned off and then be automatically reintroduced when the vehicle is placed into gear or the ignition is turned on.

Turning now to active material based actuators, suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly (sodium 4-styrenesulfonate), poly(poly(vinylamine)backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Shape memory polymers (SMPs) generally refer to a group of polymeric materials that demonstrate the ability to return to some previously defined shape when subjected to an appropriate thermal stimulus. The shape memory polymer may be in the form of a solid or a foam as may be desired for some embodiments. Shape memory polymers are capable of undergoing phase transitions in which their shape is altered as a function of temperature. Generally, SMPs are co-polymers comprised of at least two different units which may be described as defining different segments within the copolymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. With regard to shape memory polymer foams, the structure may be open celled or close celled as desired.

In practice, the SMPs are alternated between one of at least two shapes such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). SMP foams are shaped at this temperature by blow molding or shaped with an applied force followed by cooling to set the permanent shape. The temperature necessary to set the permanent shape is generally between about 40° C. to about 100° C. After expansion by fluid, the permanent shape is regained when the applied force is removed, and the expanded SMP is again brought to or above the highest or last transition temperature of the SMP. The $T_g$ of the SMP can be chosen for a particular application by modifying the structure and composition of the polymer.

The property of shape memory polymers most advantageous with regards to the deployment mechanisms described here-in is their dramatic decrease in modulus when heated above the glass transition temperature $T_g$ of their lower temperature constituent. This thus makes them eminently suited as latches (reverse actuators). At temperatures below $T_g$, they exhibit a higher modulus and can be physically positioned to block the release of stored energy such as that stored in a compressed spring. When heated above $T_g$ the SMP latch-blocking element becomes quite flexible causing the stored energy to be released.

The temperature needed for permanent shape recovery can generally be set at any temperature between about -63° C. and about 160° C. or above. Engineering the composition and structure of the polymer itself can allow for the choice of a particular temperature for a desired application. A preferred temperature for shape recovery is greater than or equal to about -30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, thermosets-thermoplastic copolymers, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acids), polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methaciylate), poly(ethyl methacrylate), poly (butyl methacrylate), poly(isobutyl methacrylate), poly (hexyl methacrylate), poly(isodecyl methacrylate), poly(lauryl mnethacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane block copolymers, styrene-butadienestyrene block copolymers, and the like.

Conducting polymerization of different monomer segments with a blowing agent can be used to form a shape memory polymer foam. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its $T_g$ but below the highest thermal transition temperature or melting point. Thus, by combining multiple soft segments it is possible to demonstrate multiple temporary shapes and with multiple hard segments it may be possible to demonstrate multiple permanent shapes.

Suitable shape memory alloy materials for use in the active material based actuators and/or the honeycomb celled materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, changes in yield strength, and/or flexural modulus properties, damping capacity, superelasticity, and the like. Selection of a suitable shape memory alloy composition depends on the temperature range where the component will operate.

Suitable magnetic materials for use in ferromagnetic SMAs include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents.

Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

It is the change (dramatic drop) in shear strength of the MR fluid, when subjected to a canceling magnetic field generated by an electromagnet, that makes them suitable for use as the activation mechanism in a releasable on demand latch or other form of deactivatable blocking mechanism for stored energy.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like. It is the change in stiffness of the MR elastomer when subjected to a magnetic field that makes them suitable for a releasable on demand latch or blocking element for the stored energy.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers of the present invention may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

It is the large strains and thus displacements possible with EAP's that make them well suited as actuators for releasing stored energy and in so doing deploying the open celled energy management devices.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A volume filling mechanical assembly for a vehicle, the assembly comprising:
   an open celled material expandable from a non-expanded state to an expanded state, wherein at least a portion of the open celled material comprises a shape memory alloy; and
   an activation mechanism regulating expansion of the open celled material from the non-expanded state to the expanded state in response to an activation signal.

2. The volume filling mechanical assembly of claim 1, wherein the shape memory alloy of the open celled material is configured to facilitate expansion of the open celled material from the non-expanded state to the expanded state, compression of the open celled material from the expanded state to the non-expanded state, a thermally activatable increase in the stiffness/energy absorption of the cellular structure, repair of the open celled material from a crushed state to a non-crushed state, or a combination comprising at least one of the forgoing.

3. The volume filling mechanical assembly of claim 1, wherein the shape memory alloy of the open celled material is configured to increase a stiffness of the open celled material.

4. The volume filling mechanical assembly of claim 1, wherein expansion of the open celled material is in a plane perpendicular to a cellular axis of the open celled material's cells.

5. The volume filling mechanical assembly of claim 1, wherein an impact crush of the open celled material is in a plane parallel or at an acute angle with respect to the cellular axis of the open celled material's cells.

6. The volume filling mechanical assembly of claim 1, wherein the activation mechanism comprises a superelastic property of the shape memory alloy, a shape memory effect of the shape memory alloy, a pyrotechnic device, a pneumatic device, an electromechanical device, an electrohydraulic device, a mechanical device, a vacuum device, or a combination comprising at least one of the foregoing activation mechanisms.

7. The volume filling mechanical assembly of claim 1, further comprising an active material actuator adapted to selectively provide the activation signal.

8. The volume filling mechanical assembly of claim 1, wherein the activation signal comprises a thermal activation signal, an electrical activation signal, a magnetic activation signal, a mechanical activation signal, a pneumatic activation signal, a vacuum activation signal, or a combination comprising at least one of the foregoing activation signals.

9. The volume filling mechanical assembly of claim 1, further comprising a sensor in operative communication with the activation mechanism.

10. The volume filling mechanical assembly of claim 1, wherein the open celled material comprises a honeycomb structure.

11. The volume filling mechanical assembly of claim 1, further comprising a first rigid end cap connected to one end of the open celled material; and a second rigid end cap connected to an other end of the open celled material.

12. A method of operating a volume filling structure, comprising:
sensing an impact event;
producing an activation signal; and
expanding the volume filling structure from a non-expanded state to an expanded state upon the sensed impact event, wherein the volume filling structure comprises an open celled material, wherein at least a portion of the open celled material comprises a shape memory alloy, and an activation mechanism regulating expansion of the volume filling structure from the non-expanded state to the expanded state in response to the activation signal.

13. The method of claim 12, further comprising resetting the volume filling structure from the expanded state to the non-expanded state after the sensed impact event.

14. The method of claim 13, wherein resetting the volume filling structure comprises thermally activating the shape memory alloy of the open celled material.

15. The method of claim 12, further comprising increasing a stiffness of the open celled material by heating the shape memory alloy of the expanded volume filling structure.

16. The method of claim 12, wherein the expanding occurs in a plane perpendicular to or at an acute angle to a cellular axis of the open celled material's cells.

17. The method of claim 12, further comprising crushing the open celled material in a plane parallel or at an acute angle with respect to the cellular axis of the open celled material's cells.

18. The method of claim 17, further comprising repairing the open celled material from a crushed state to a non-crushed state.

19. The method of claim 12, wherein the activation mechanism comprises a superelastic property of the shape memory alloy, a shape memory effect of the shape memory alloy, a pyrotechnic device, a pneumatic device, an electromechanical device, an electrohydraulic device, a mechanical device, a vacuum device, or a combination comprising at least one of the foregoing activation mechanisms.

20. The method of claim 12, wherein expanding the open celled material from the non-expanded state to the expanded state comprises an expansion ratio of about 1:10 to about 1:60.

* * * * *